E. F. NORELIUS.
TRANSMISSION MECHANISM FOR TRACTORS.
APPLICATION FILED NOV. 8, 1918.
1,387,009.
Patented Aug. 9, 1921.
2 SHEETS—SHEET 2.
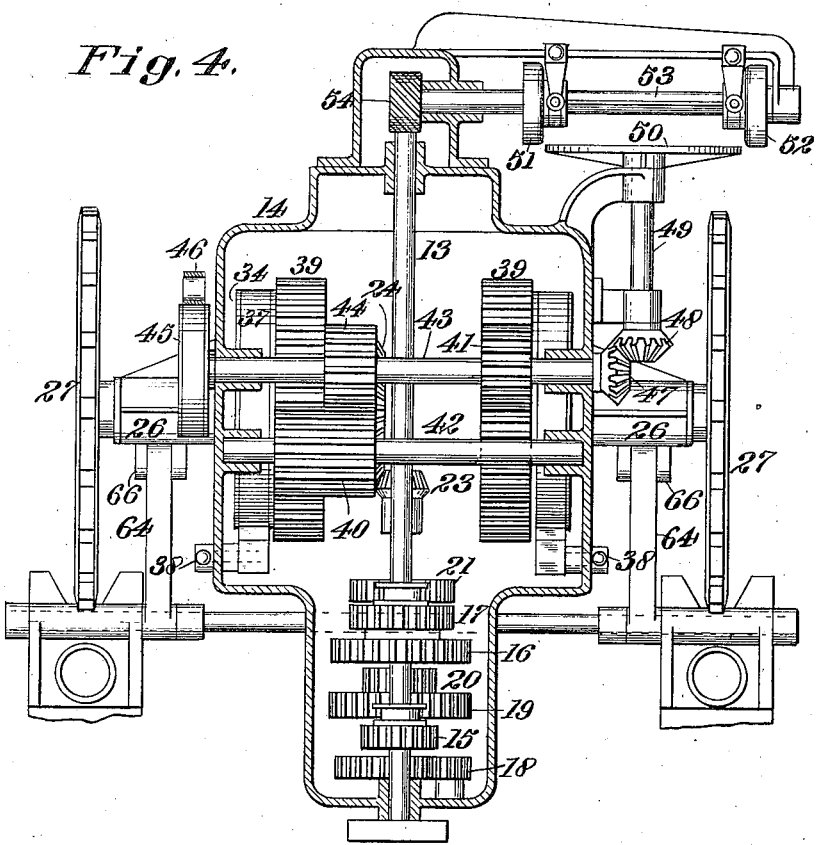
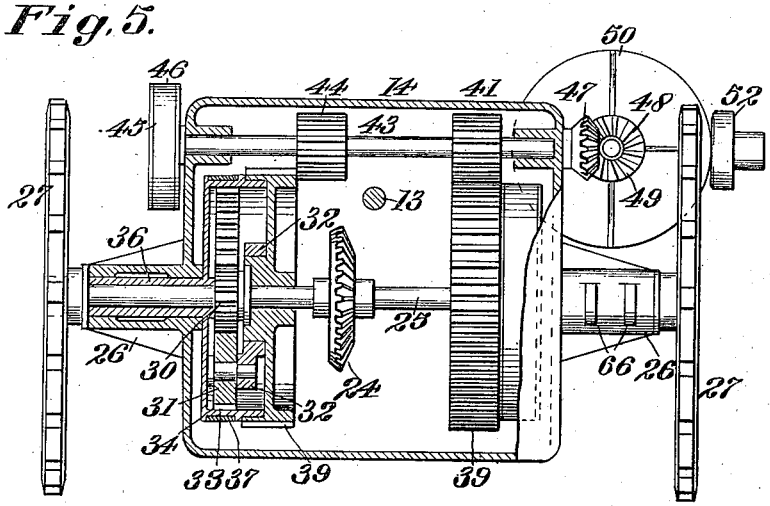
Inventor
Emil F. Norelius
By Strong & Townsend
Attorneys

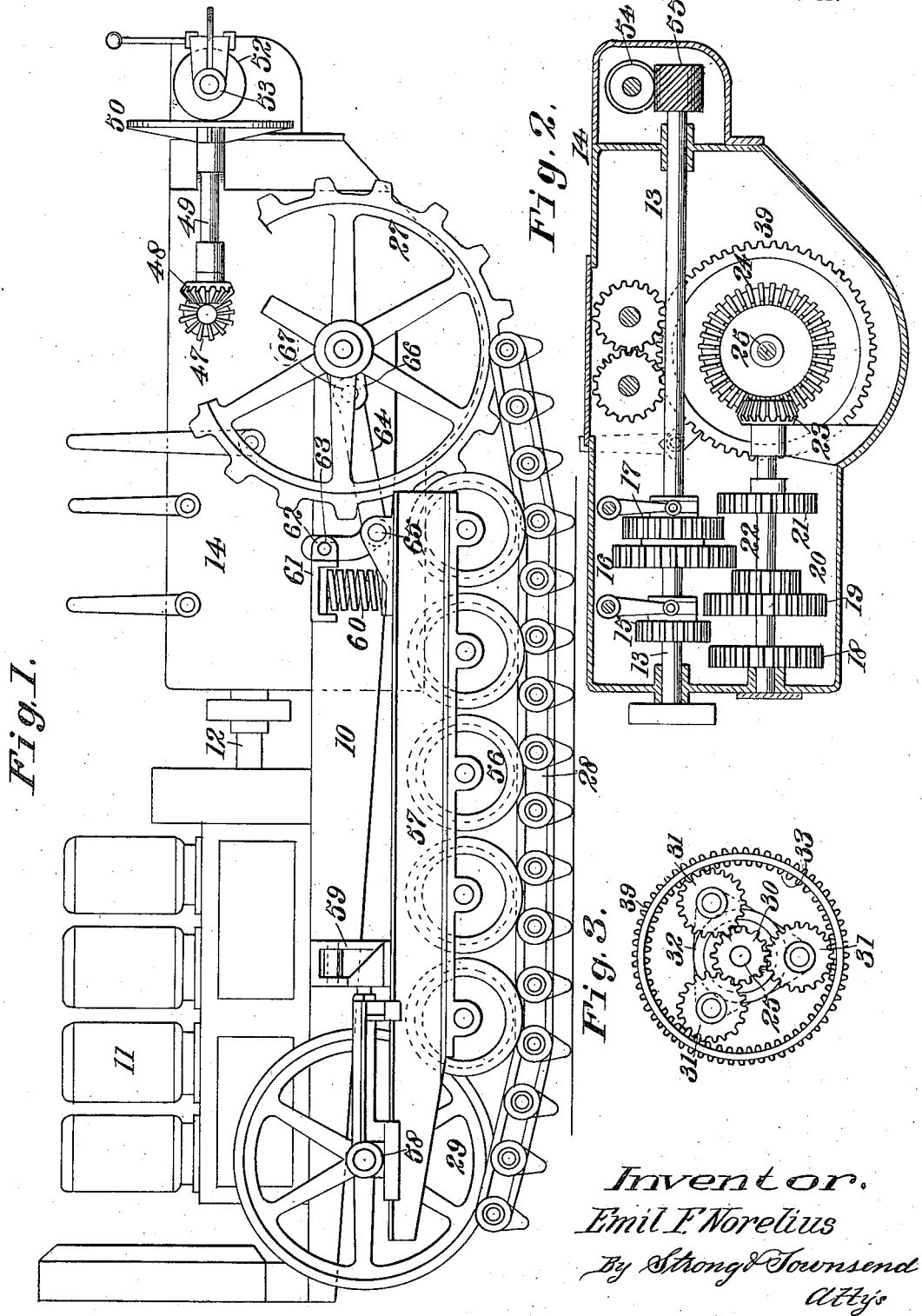

UNITED STATES PATENT OFFICE.

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

TRANSMISSION MECHANISM FOR TRACTORS.

1,387,009. Specification of Letters Patent. Patented Aug. 9, 1921.

Application filed November 8, 1918. Serial No. 261,631.

*To all whom it may concern:*

Be it known that I, EMIL F. NORELIUS, a citizen of the United States, residing at Peoria, in the county of Peoria and State of Illinois, have invented a new and useful Improvement in Transmission Mechanism for Tractors, of which the following is a specification.

This invention relates to a transmission mechanism, and particularly pertains to a structure for steering the separate tracks of a chain track tractor, as generally indicated in my copending application entitled Transmission mechanism, filed concurrently herewith, Serial No. 261,632, and an application entitled Tractor transmission, filed September 17, 1918, Serial No. 254,443.

It is the principal object of this invention to provide a tractor transmission adapted to be driven from a common source of power and to drive separate driving units at variable rates of speed, it being especially provided that all of the transmission elements will be in engagement continuously and that variation in the speed will be produced by optionally effecting the operation of certain of the transmission elements without disengaging them. Other objects will appear hereinafter.

The invention is illustrated by way of example in the accompanying drawings, in which—

Figure 1 is a view in side elevation disclosing a completely assembled tractor and with parts broken away to more clearly illustrate the mounting of the transmission thereon.

Fig. 2 is a view in longitudinal section taken centrally of the transmission mechanism and particularly showing the speed changing driving gears and one portion of the steering mechanism.

Fig. 3 is a view in elevation illustrating one of the planetary gear sets through which the traction units are driven.

Fig. 4 is a view in plan illustrating the entire transmission mechanism with parts of the case broken away and further disclosing the steering control apparatus.

Fig. 5 is a view in transverse section through the transmission mechanism showing the driving connection between the transmission and the sprockets of the track units.

Referring to the drawings, 10 indicates a tractor main frame upon the forward end of which is mounted an engine 11. A propeller shaft 12 is driven by this engine and extends rearwardly therefrom to connect with a transmission drive shaft 13 carried within a transmission case 14. The drive shaft extends longitudinally of the tractor, and is shown in Fig. 2 as being fitted with slide gears 15, 16 and 17, which are splined upon it and may be manipulated to mesh with gears 18, 19, 20 and 21. The last-named gears are carried upon a jack shaft 22 parallel to the drive shaft 13 and in a vertical plane therebeneath. The rear end of the jack shaft is fitted with a bevel pinion 23 in mesh with an enlarged bevel driving gear 24. The driving gear is fixed upon an axle 25 which extends at right angles to the jack shaft and is disposed in the same horizontal plane therewith. The axle 25 extends outwardly through bearing sleeves 26 in the opposite sides of the transmission case and is there fitted with chain track driving sprockets 27 free to rotate thereon. Each of these sprockets is provided to receive a chain tread track 28 which passes around the sprockets and also around idler wheels 29 mounted in a manner which will be hereinafter set forth.

Fixed upon the axle 25 at the opposite sides of the driving gear 24 are driving pinions 30. These pinions are shown in Fig. 3 as in constant mesh with a set of planetary gear pinions 31 which are carried by a triangular gear spider 32. The planetary pinions in turn mesh with an internal gear 33 formed around the inner circumference of a drum 34. This drum is mounted to freely rotate around the axle 25 upon a hub 36 through which the axle extends, the hub being rotatably supported within the bearing 26. These drums are in reality the brake drums of the vehicle and their hubs are securely fixed to rotate with the sprockets 27. Brake bands 37 circumscribe the drums and may be contracted and expanded by operating mechanisms 38. Fixed around the outer face of each of the drums is a large spur gear 39 which is free to rotate in relation to the drum and the shaft. The hubs of these gears form mountings for the planetary gear spiders 32 and insure that rotation of the gears will produce simultaneous rotation of the spiders.

The spur gears 39 separately mesh with spur pinions 40 and 41. The pinion 40, which is in mesh with the left-hand gear 39, is mounted upon a steering shaft 42. This shaft stands laterally within the transmission case and is parallel to a second steering shaft 43. The gear 40 is of considerable length and meshes with the left-hand gear 39 as well as the reversing pinion 44 secured upon the shaft 43 and out of mesh with the gear 39. The shaft 43 further carries the pinion 41 in mesh with the right-hand gear 39. This shaft is rotatably supported within the transmission case and extends outwardly through the opposite ends thereof. At its left end a brake drum 45 is secured and may be acted upon by a brake band 46. At the opposite end a bevel driving pinion 47 is fixed. The driving pinion 47 is in mesh with a complementary pinion 48 secured to the end of a clutch shaft 49. This shaft is rotatably held within bearings upon the outside of the transmission case and is parallel to the main shaft 13. The rear end of the shaft 49 carries a friction disk 50. This disk may be oppositely rotated by the separate engagement of sliding friction members 51 and 52 therewith. The friction members are splined upon a spline shaft 53 extending at right angles to the shaft 49 and driven by the main shaft 13 through worm gears 54 and 55. Suitable lever control means is provided to simultaneously move the clutch members 51 and 52 and to permit them to alternately engage the face of the disk 50 upon opposite sides of its rotating axis.

The sprockets 27 which are driven by the transmission mechanism drive the chain tracks 28. The lower run of each of these tracks supports a series of rollers 56, which are carried in bearings upon the under side of the truck frames 57. The forward ends of these frames are preferably forked to accommodate the idler wheels 29 and carry slidable bearings 58 in which the axles of the idler wheels are rotatably held. These frames are connected to the forward end of the main frame 10 by a cross beam 59 which is pivoted at its opposite ends to the frames and is further pivoted centrally to the main frame. The rear ends of the truck frames 57 terminate near the sprockets 27 and support the rear of the main frame by means of helical compression springs 60. The upper ends of these springs bear against brackets 61 extending outwardly from the sides of the main frame. These brackets are also formed with rearwardly extending lugs 62 carrying guide pins 63. The guide pins engage slotted openings in bell crank links 64 which are pivoted upon pins 65 carried upon the truck frames and which further extend rearwardly to connect with shackle members 66 by means of pins 67. In this manner the rear ends of the truck frames will be held against lateral movement and will be allowed limited vertical movement as the springs 60 are compressed, the members 64 acting to guide the truck frames and hold them in proper relation to the axle 25.

In operation, the engine acts through the propeller shaft 12 and the main shaft 13 to drive the gears splined upon this last-named shaft. These gears may be brought to mesh with the desired complementary gears upon the shaft 22 and will thereafter act through the bevel gears 23 and 24 to drive the axle 25. Rotation of the axle 25 will produce simultaneous rotation of the two gears 30 and this will act, under normal circumstances, to drive the drums 34 through the driving pinions 31. It will be recognized that a reduction in speed will thus be effected and that the rotation of the drum will produce direct rotation of the sprockets 27.

Under normal conditions, the brake bands 37 are not in engagement with the drums and only are brought to engage therewith when a braking action is desired. Furthermore, the two brake drums and sprockets will normally rotate at the same rate of speed and will thus insure that the tractor pursue a straight course of travel. When it is desired to change the course of travel of the vehicle, the friction members 51 and 52 are shifted to bring either one of them into frictional engagement with the face of the disk 50. These friction members are continuously driven by the main drive shaft 13. When one friction member engages the disk it will rotate in one direction and when the other friction member engages the disk it will rotate in the opposite direction. Rotation of the disk in either direction will produce simultaneous rotation of the shaft 43. Consequently, gears 40 and 41 will be driven in opposite directions and will thereafter drive the spur gears 39 in opposite directions. This will cause one of the planetary gear spiders to rotate forwardly and the other rearwardly, and will accelerate the speed of the ring gear 31 in mesh with the forwardly rotating gears and decrease the speed of the ring gear in mesh with the rearwardly rotating gears, thus changing the speed ratio between the two sprockets 27 and the driving axle. This will cause one chain track to travel considerably faster than the other and turn the vehicle from its straight course of travel. An arc will be described by the vehicle as it moves, and this arc will be determined by the speed of the driving axle in relation to the speed of the main shaft as controlled by the speed changing gears shown in Fig. 2.

It will thus be seen that by the simple mechanism here disclosed a flexible control will be provided to guide a chain tread tractor, as desired, without the necessity of disengaging any of the transmission units or retarding their speed at the expense of the dissipation of power as would be produced by the use of slipping clutches and friction brakes.

Having thus described my invention, what I claim and desire to secure by Letters Patent is—

1. A power transmission mechanism comprising a casing, a driving shaft carried thereby, an axle driven by the shaft, sprockets freely mounted to rotate on the opposite ends of the axle, brake drums contained within the case and fixed to rotate with the sprockets, gear means inclosed within the brake drums and adapted to be positively driven by the axle and power operated means adapted to affect the gears within the brake drums to cause acceleration in the speed of one sprocket and reduction in the speed of the other as compared with the speed of the driving axle.

2. A power transmission mechanism comprising a transmission casing, a main shaft, speed changing gears carried thereby, a drive shaft adapted to be driven from the main shaft, an axle in constant mesh with the driving shaft and driven thereby, freely rotating sprockets carried at the opposite ends of the axle, brake drums inclosed within the transmission case and rotatably supported thereby around the axle, said drums being fixed to the sprockets, a planetary gear set inclosed within each of said drums and power driven means for effecting the operation of said gear sets to simultaneously produce acceleration and decrease in the speeds of rotation of the two sprockets.

3. A power transmission mechanism comprising a transmission casing, a main shaft, speed changing gears carried thereby, a drive shaft adapted to be driven from the main shaft, an axle in constant mesh with the driving shaft and driven thereby, freely rotating sprockets carried at the opposite ends of the axle, brake drums inclosed within the transmission case and rotatably supported thereby around the axle, said drums being fixed to the sprockets, a planetary gear set inclosed within each of said drums and power driven means for effecting the operation of said gear sets to simultaneously produce acceleration and decrease in the speeds of rotation of the two sprockets and means for normally locking the speed changing mechanism against rotation.

4. A transmission mechanism comprising a main shaft, a drive shaft, speed changing gears adapted to operatively connect said shafts, a case for said gears, a driving axle driven from said drive shaft, brake drums mounted to rotate around said axle and further mounted to rotate within bearings upon the transmission case, driving sprockets supported by the opposite ends of said axle and fixed to rotate the said brake drums, internal gears fixed within said brake drums, driving gears upon the axles, planetary gears meshing with both of said gears whereby rotation of the axle will produce rotation of the brake drums at a reduced rate of speed and power driven means affecting said planetary gears to vary the speeds of rotation of the two sprockets.

5. A transmission mechanism comprising a main shaft, a drive shaft, speed changing gears adapted to operatively connect said shafts, a driving axle driven from said drive shaft, brake drums mounted to rotate around said axle and further mounted to rotate within bearings upon the transmission case, driving sprockets supported by the opposite ends of said axle and fixed to rotate the said brake drums, internal gears fixed within said brake drums, driving gears upon the axles, planetary gears meshing with both of said gears whereby rotation of the axle will produce rotation of the brake drum at a reduced rate of speed, gear spiders carrying said planetary gear sets and power driven means adapted to produce movement of said spiders to vary the speed of rotation of the sprockets in relation to the axle.

6. A transmission mechanism comprising a main shaft, a drive shaft, speed changing gears adapted to operatively connect said shafts, a driving axle driven from said drive shaft, brake drums mounted to rotate around said axle and further mounted to rotate within bearings upon the transmission case, driving sprockets supported by the opposite ends of said axle and fixed to rotate the said brake drums, internal gears fixed within said brake drums, driving gears upon the axles, planetary gears meshing with both of said gears whereby rotation of the axle will produce rotation of the brake drums at a reduced rate of speed, gear spiders carrying said planetary gear sets, spur gears fixed to support said spiders and free to rotate around the driving axle and power means for producing opposite rotation of said spur gears to effect a variation in the speeds of the sprockets.

7. In a power transmission mechanism, a main shaft, a driving shaft, speed changing gears adapted to be brought in mesh to operatively connect said shafts, a driving axle, sprockets mounted to rotate upon the opposite ends of said axle, a gear case supporting the axle, brake drums housed within the gear case and supported thereby to rotate freely around the axle, said drums being fixed to rotate with the sprockets, internal gears positioned within said brake drums, planetary gears in mesh with said internal gears, driving gears carried by the axle and in mesh with the planetary gears, gear spiders supporting said planetary gears and free to rotate around the axle, spur gears fixed to the gear spiders, steering gears in mesh with the gear spiders and means for selectively driving said steering gears alternately and in opposite directions to produce a desired rotation of the gear spiders and thereby effect a variation in the speeds of rotation of the sprockets.

In testimony whereof I have hereunto set my hand in the presence of two subscribing witnesses.

EMIL F. NORELIUS.

Witnesses:
 AUG. SCHNEIDER,
 CHAS. M. FORESMAN.